3,434,382
SECURING A GUN TURRET ON AN ARMORED VEHICLE
Karl Kirsch, Haunstetten, and Siegfried Uhl and August Schiele, Augsburg, Germany, assignors to Keller & Knappich G.m.b.H., Augsburg, Germany, a corporation of Germany
Filed Feb. 20, 1967, Ser. No. 617,217
Claims priority, application Germany, Mar. 3, 1966, K 58,620
Int. Cl. F41h 5/18, 5/20
U.S. Cl. 89—36      5 Claims

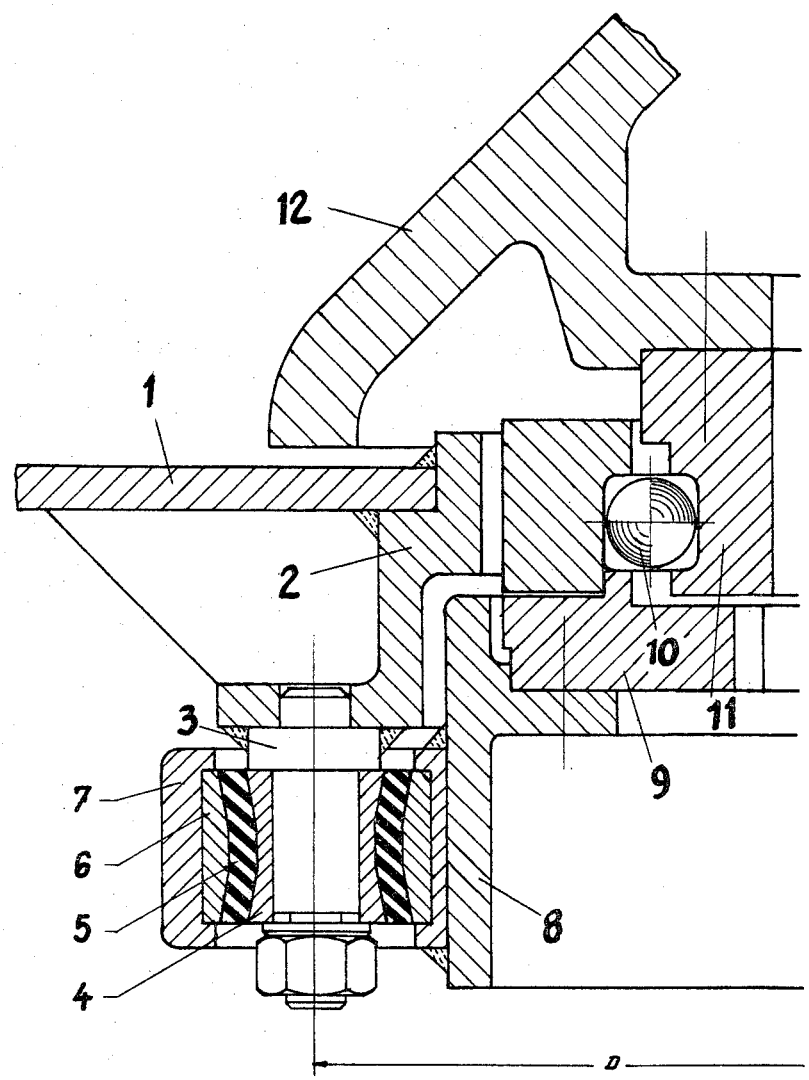

ABSTRACT OF THE DISCLOSURE

Armored vehicle having a gun turret mounted on a nonrotatable bearing ring, wherein the nonrotatable bearing ring is secured to the vehicle roof by means of a plurality of supporting bolts each mounted within a shock absorbing resilient ring means located between the bearing ring and roof structure.

---

Prior application: Priority German K 58,620, Mar. 3, 1966.

Background of the invention

The present invention concerns an armored vehicle having a rotatably mounted gun turret, more especially for use with rapid firing guns. The nonrotatable bearing ring on which the turret is mounted, usually in ball bearings, has hitherto been rigidly mounted on the vehicle roof.

For the purpose of improving the firing accuracy of rapid firing guns, it is known to mount vibration absorbing resilient washers of rubber-like plastic material between cylindrical mounting pins of the gun cradle, about which elevational movements may be made, and its pivotal shield (see applicants' Canadian Patent No. 652,191). This absorbs the vibration occurring in rapid firing guns to a degree impossible to achieve by the use of a recoil brake alone.

Summary of the invention

The object of the present invention is to achieve the same result on a broad basis, in order if need be to use simpler means for accommodating several guns in a single gun turret.

The novelty of the invention resides in that the nonrotatable bearing ring is secured to the vehicle roof by means of a plurality of supporting bolts each mounted within a resilient ring. It has been found, surprisingly, that with such a resilient mounting of the whole gun turret the vibrations are absorbed to such an extent as to maintain the high firing accuracy required. The invention also presents the considerable advantage that the vibration damping means may be arranged entirely in the gun carriage. A further advantage is that a gun turret so mounted in the carriage has increased protection against enemy hits, since the penetrating power of a striking projectile is partially absorbed by the resilient turret mounting.

To permit the resilient rings, which may be of rubber or other resilient plastic material, to absorb forces both in a radial and axial direction relative to the supporting bolts they are expediently of concavo-convex shape. For more convenient mounting and more ready manufacture the rings may be vulcanized between steel bushes.

Preferably the rubber or the like rings are suspended on the supporting bolts, since this involves the smallest tilting moment.

Brief description of drawing

The invention will now be described further, by way of example, with reference to the accompanying drawing in which the single figure is a sectional detail of a gun turret constructed in accordance with the invention.

Description of specific embodiment

Welded firmly to the turret section of the armored vehicle roof 1 is an inwardly projecting flanged ring 2, on which are secured over its circumference—having a pitch diameter D—a plurality of, for example twelve, collar supporting bolts 3. Mounted on the bolts 3 are "swing-metal members," each of which comprises an inner bush 4 and an outer bush 6 having vulcanized therebetween a ring 5 of rubber or rubber-like resilient plastic material. The rings 5 may be of concavo-convex longitudinal section. The rings may obviously be bowed in either an outward or inward direction, the latter being shown in the drawing. The outer bushes 6 are received by eyelets 7 which are secured to a ring 8 serving to receive the nonrotatable bearing ring 9 associated in a conventional manner with ball bearings 10 and an inner or rotatable ring 11 on which the gun turret is mounted.

We claim:
1. An armored construction for carrying a gun comprising:
   (a) a body having a top portion,
   (b) a nonrotatable bearing ring,
   (c) bolt means securing said ring to said top portion,
   (d) a resilient ring means being suspended on each bolt means between the said ring and top portion to absorb vibration effected in a radial direction upon firing of the gun, and
   (e) a gun turret rotatably mounted on said nonrotatable bearing ring.
2. A construction according to claim 1, wherein each resilient ring means is substantially cylindrical and has a concavo-convex longitudinal section.
3. A construction according to claim 1, wherein each resilient ring means is sandwiched radially between steel bushes.
4. A construction according to claim 3, wherein each resilient ring means is rubber vulcanized between substantially concentric steel bushes.
5. A construction according to claim 1, wherein the resilient rings are made of a material from the group comprising rubber and resilient plastic material.

References Cited

UNITED STATES PATENTS

| 1,594,455 | 8/1926 | Conlon. | |
|---|---|---|---|
| 2,016,292 | 10/1935 | Rarey | 89—40 X |
| 2,051,205 | 8/1936 | Estabrook | 248—18 |
| 3,351,374 | 11/1967 | Forsyth et al. | |

FOREIGN PATENTS 826,322   3/1938   France.

BENJAMIN A. BORCHELT, *Primary Examiner.*
STEPHEN A. BENTLEY, *Assistant Examiner.*